(12) United States Patent
Jiang et al.

(10) Patent No.: US 10,303,005 B2
(45) Date of Patent: May 28, 2019

(54) LIQUID CRYSTAL DISPLAY PANEL AND MANUFACTURING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Kun Jiang, Beijing (CN); Jian Wang, Beijing (CN); Wenqing Zhao, Beijing (CN); Shuai Han, Beijing (CN); Qunlei Wang, Beijing (CN); Wei Zhao, Beijing (CN); Na Li, Beijing (CN); Xuechao Song, Beijing (CN); Ruichen Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 470 days.

(21) Appl. No.: 15/091,397

(22) Filed: Apr. 5, 2016

(65) Prior Publication Data

US 2016/0313591 A1    Oct. 27, 2016

(30) Foreign Application Priority Data

Apr. 22, 2015   (CN) .......................... 2015 1 0194387

(51) Int. Cl.
*G02F 1/1339*     (2006.01)
*G02F 1/1337*     (2006.01)

(52) U.S. Cl.
CPC ........ *G02F 1/13394* (2013.01); *G02F 1/1337* (2013.01); *G02F 2202/28* (2013.01); *Y10T 428/1059* (2015.01)

(58) Field of Classification Search
CPC ............... G02F 1/1337; G02F 1/13394; G02F 2202/28; Y10T 428/1059
See application file for complete search history.

(56) References Cited

U.S. PATENT DOCUMENTS

| | | | |
|---|---|---|---|
| 5,846,657 A | * | 12/1998 | Wu ..................... C08F 20/18 428/402 |
| 2009/0033859 A1 | * | 2/2009 | Ueda .................. G02F 1/13392 349/155 |
| 2009/0091677 A1 | | 4/2009 | Cho et al. |

FOREIGN PATENT DOCUMENTS

| | | |
|---|---|---|
| CN | 101180568 A | 5/2008 |
| CN | 101957521 A | 1/2011 |

(Continued)

OTHER PUBLICATIONS

Second Chinese Office Action, for Chinese Patent Application No. 201510194387.3, dated Sep. 18, 2017, 7 pages.

(Continued)

*Primary Examiner* — Sophie Hon
(74) *Attorney, Agent, or Firm* — Kinney & Lange, P.A.

(57) ABSTRACT

This disclosure provides a liquid crystal display panel and the manufacturing method thereof, and relates to the technical field of display. By the manufacturing method, the problem of damage to the inner surfaces of the color filter substrate and the array substrate at a positions corresponding to the spacer caused by the sliding of the spacer may be prevented. The liquid crystal display panel comprises a first substrate and a second substrate which are cell-assembled, and said first substrate comprises a spacer formed by a patterning process, and the inner surface of said first substrate and the inner surface of said second substrate are connected by a bonding agent at a position where said spacer is provided.

2 Claims, 5 Drawing Sheets

(56) References Cited

FOREIGN PATENT DOCUMENTS

| | | |
|---|---|---|
| CN | 102269897 A | 12/2011 |
| CN | 102736322 A | 10/2012 |
| CN | 103207480 A | 7/2013 |

OTHER PUBLICATIONS

First Chinese Office Action dated Apr. 27, 2017, for corresponding Chinese Application No. 201510194387.3.
Third Chinese Office Action, for Chinese Patent Application No. 201510194387.3, dated Jan. 17, 2018.

* cited by examiner

LIQUID CRYSTAL DISPLAY PANEL AND MANUFACTURING METHOD THEREOF

CROSS-REFERENCE TO RELATED APPLICATION

This application claims the priority of China Patent Application No. 201510194387.3, filed on Apr. 22, 2015.

TECHNICAL FIELD

This disclosure relates to the technical field of display, and particularly to a liquid crystal display panel and the manufacturing method thereof.

BACKGROUND ART

Figure 1:
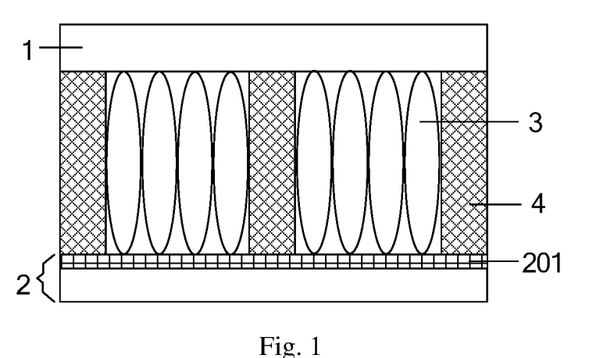
FIG. 1 is a structural schematic diagram of a liquid crystal display panel provided in the prior art.

Liquid crystal display panels have been widely used in the technical field of display. As shown in FIG. 1, a liquid crystal display panel comprises a color filter substrate 1 and an array substrate 2 which are cell-assembled, as well as a liquid crystal 3 and a spacer 4 formed therebetween, wherein the spacer 4 is generally formed on the color filter substrate 1 such that the liquid crystal display panel has a certain cell thickness.

However, in the process for cell-assembling the color filter substrate 1 and the array substrate 2 or in the process for use, the spacer 4 may be squeezed by liquid crystal nearby to slide back and forth, thereby causing damage to the inner surfaces of the color filter substrate 1 and the array substrate 2 at a position corresponding to the spacer 4 and decreasing the quality of the display panel. For example, with reference to those as shown in FIG. 1, the array substrate 2 comprises an alignment film 201 such that liquid crystal molecules have an initial orientation. Thus, the back-and-forth sliding of the spacer 4 may cause damage to the spacer 4 and the alignment film 201 in contact with the spacer 4, thereby causing uneven display, which severely affects the display effect and decreases the quality of the display panel.

SUMMARY

Embodiments of this disclosure provide a liquid crystal display panel and the manufacturing method thereof. By the manufacturing method, the problem of damage to the inner surfaces of the color filter substrate and the array substrate at a position corresponding to the spacer caused by the sliding of the spacer may be prevented.

The embodiments of this disclosure employ the following technical solutions.

In one aspect, a liquid crystal display panel is provided, said liquid crystal display panel comprising a first substrate and a second substrate which are cell-assembled, wherein said first substrate comprises a spacer formed by a patterning process, and the inner surface of said first substrate and the inner surface of said second substrate are connected by a bonding agent at a position where said spacer is provided.

In another aspect, a manufacturing method for a liquid crystal display panel is provided, said method comprising: forming a spacer on a first base of a first substrate by a patterning process; providing a bonding agent on the inner surface of said first substrate or the inner surface of a second substrate at a position corresponding to said spacer; and cell-assembling said first substrate provided with the spacer and said second substrate such that the inner surface of said first substrate and the inner surface of said second substrate are connected together by said bonding agent at the position where said spacer is provided.

In the liquid crystal display panel provided by embodiments of this disclosure, by providing a bonding agent on the inner surface of the first substrate or the inner surface of the second substrate at a position corresponding to the spacer, the inner surface of the first substrate and the inner surface of the second substrate may be connected together by the bonding agent at the position where said spacer is provided, so as to prevent back-and-forth sliding of the spacer. This solves the problem of damage to the inner surfaces of the color filter substrate and the array substrate at the position corresponding to the spacer caused by the sliding of the spacer, and in turn improves the quality of the display panel.

BRIEF DESCRIPTION OF DRAWINGS

In order to illustrate the technical solutions in embodiments of this disclosure or in the prior art more clearly, figures required for describing the embodiments or the prior art will be simply introduced below. It is apparent that the figures described below are merely some embodiments of this disclosure, and other figures may be further obtained by ordinary skilled person in the art according to these figures without inventive work.

REFERENCE NUMERALS

1—color filter substrate; 2—array substrate; 201—alignment film; 3—liquid crystal; 4—spacer; 30—bonding agent; 40—first substrate; 400—first base; 401—inner surface of first substrate; 402—first alignment film; 50—second substrate; 500—second base; 501—inner surface of second substrate; 502—second alignment film.

DESCRIPTION OF EMBODIMENTS

The technical solutions in embodiments of this disclosure will be clearly and fully described below in conjunction with accompanying drawings of the embodiments. Obviously, the embodiments described are merely a part of the embodiments of this disclosure, rather than all of the embodiments. Based on the embodiments described, other embodiments obtainable by those of ordinary skill in the art without inventive work all fall within the scope protected by this disclosure.

It is to be indicated that, in order to describe embodiments provided in this disclosure more clearly, in all embodiments of this disclosure, a base and an alignment film included in the first substrate are all named by a first base and a first alignment film, and a base and a alignment film included in the second substrate are all named by a second base and a second alignment film. Furthermore, the first substrate in embodiments of this disclosure may be a color filter substrate and may also be an array substrate. When the first substrate is a color filter substrate, the second substrate is an array substrate; and when the first substrate is an array substrate, the second substrate is a color filter substrate. There are no specific definitions for the first and second substrates in embodiments of this disclosure, and they can be determined according to practical situations.

It is to be further indicated that orientations and positional relationships indicated by terms "above", "below", etc., are based on orientations or positional relationships as shown in figures. They are merely intended to facilitate and simplify the description of this disclosure, but do not indicate or imply that indicated apparatuses or elements necessarily have specific orientations or are configured and operated in specific orientations. Therefore, they may not be understood as limit to this disclosure.

Embodiment 1

Figure 2:
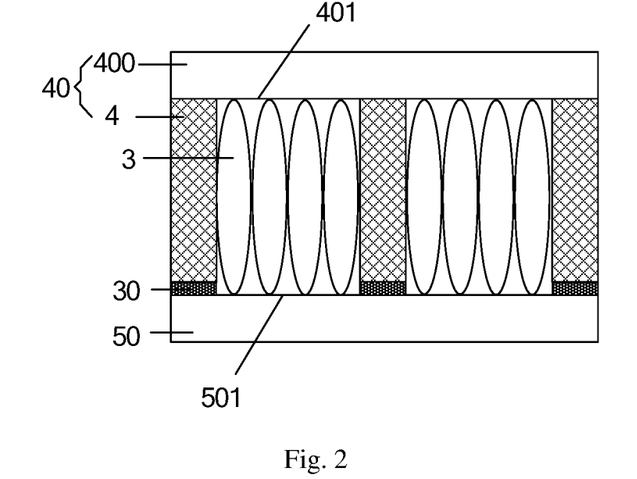
FIG. 2 is a structural schematic diagram of a liquid crystal display panel provided in an embodiment of this disclosure.

This embodiment provides a liquid crystal display panel as shown in FIG. 2. The liquid crystal display panel comprises a first substrate 40 and a second substrate 50 which are cell-assembled, wherein the first substrate 40 comprises a spacer 4 formed by a patterning process, and the inner surface 401 of the first substrate and the inner surface 501 of the second substrate are connected by a bonding agent 30 at a position where the spacer 4 is provided.

In the liquid crystal display panel described above, the spacer is formed by a patterning process, wherein the patterning process is a process in which a thin film is formed into a layer comprising at least one pattern. The patterning process typically comprises: coating a photoresist on a thin film, exposing the photoresist via a mask plate, then ablating off the photoresist required to be removed using a developer, then etching off the part of the thin film which is not covered by photoresist, and finally peeling the remaining photoresist. In embodiments of this disclosure, the spacer may be formed by a one-time patterning process. The one-time patterning process refers to a process wherein a desirable layer structure is formed through one-time exposure, which may reduce production cost and simplify production process. Furthermore, the shape of the spacer is not limited in this disclosure, and may be cylindrical, may also be frusta-conical, and of course may further be other shapes, as long as it functions as a support. Embodiments and figures of this disclosure are all illustrated by exemplifying cylindrical spacers.

In the liquid crystal display panel described above, as shown in FIG. 2, the inner surface 401 of the first substrate and the inner surface 501 of the second substrate each refers to a surface at the side adjacent to the liquid crystal 3. Furthermore, the bonding agent may be an adhesive, may also be a crosslinking agent, and may further be other substance having a function of connection. There is no specific limit on the bonding agent in this embodiment, as long as it is capable of having the function of connection.

This embodiment provides a liquid crystal display panel, in which, by providing a bonding agent on the inner surface of the first substrate or the inner surface of the second substrate at a position corresponding to the spacer, the inner surface of the first substrate and the inner surface of the second substrate may be connected together by the bonding agent at the position where said spacer is provided, so as to prevent back-and-forth sliding of the spacer. This solves the problem of damage to the inner surfaces of the color filter substrate and the array substrate at the position corresponding to the spacer caused by the sliding of the spacer, and in turn improves the quality of the display panel.

Generally, the first substrate further comprises a first alignment film, and the second substrate further comprises a second alignment film, such that liquid crystal molecules have a certain initial orientation. The positional relationship between the first alignment film of the first substrate and the spacer is not limited in this disclosure. That is, the first alignment film may be formed above the spacer and covers the spacer, and the first alignment film may also be formed below the spacer. Detailed illustrations will be made below by embodiment 2 and embodiment 3.

Embodiment 2

Figure 3A:
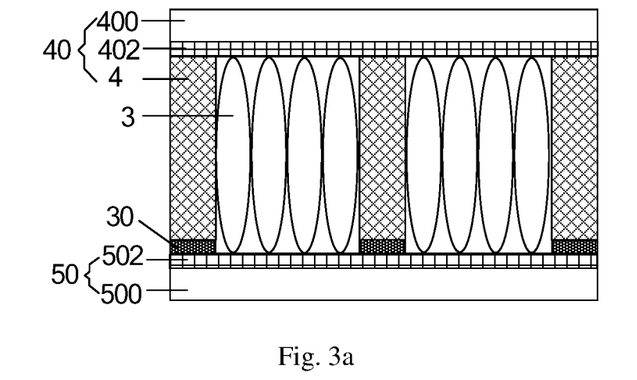
FIG. 3a is a structural schematic diagram of a liquid crystal display panel provided in an embodiment of this disclosure before crosslinking reaction.
Figure 3B:
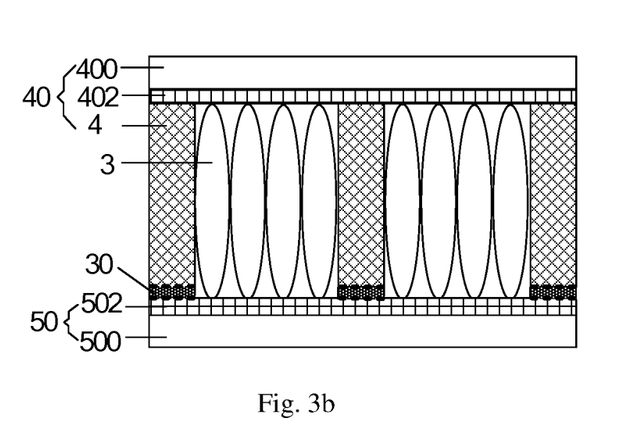
FIG. 3b is a structural schematic diagram of the liquid crystal display panel as shown in FIG. 3a after crosslinking reaction.

This embodiment provides a liquid crystal display panel as shown in FIGS. 3a and 3b. The liquid crystal display panel comprises a first substrate 40 and a second substrate 50 which are cell-assembled, the first substrate 40 comprises a spacer 4 formed by a patterning process, and further comprises a first alignment film 402, where the spacer 4 is located at the innermost side of the first substrate 40, and the innermost side of the second substrate 50 is formed with a second alignment film 502.

The inner surface of the first substrate and the inner surface of the second substrate being connected by a bonding agent at the position where the spacer is provided particularly comprises: the spacer and the second alignment film being connected by a bonding agent at the position where the spacer is provided.

Thus, in the process of cell-assembling the first substrate and the second substrate or in the process of using this liquid crystal display panel, since the spacer and the second alignment film are connected at the position where the spacer is provided, the spacer will not slide back and forth as being squeezed by liquid crystal nearby, thereby prevent the problem of damage to the spacer and the second alignment film in contact with the spacer.

Further, the bonding agent described above may be a crosslinking agent. The crosslinking agent may plays a role in bridging between linear molecules so as to allow a plurality of linear molecules to be bonded and crosslinked to each other into a substance with a network structure, thereby improving the binding strength between the plurality of linear molecules.

In this embodiment, the spacer and the second alignment film may be connected by a crosslinking agent at the position where the spacer is provided. Particularly, the spacer and the second alignment film are connected together by crosslinking reaction occurring between a first functional group in the molecular structure of the material of the spacer and a third functional group in the molecular structure of the crosslinking agent and between a second functional group in the molecular structure of the material of the second alignment film and a third functional group in the molecular structure of the crosslinking agent.

Herein, the third functional group in the molecular structure of the crosslinking agent may be an amino group, and the crosslinking agent comprising an amino group may be a polyamine type initiator. The polyamine type initiator is generally a polymer compound having a molecular structure of general formula wherein R is a typical connecting group. Of course, the third functional group in the molecular structure of the crosslinking agent may also be other functional groups, as long as the crosslinking reaction may occur, and it is illustrated herein merely by exemplifying the third functional group as an amino group.

It is to be indicated herein that after the third functional group in the molecular structure of the crosslinking agent is determined, the first functional group in the molecular structure of the material of the spacer and the second functional group in the molecular structure of the material of the second alignment film are then determined. That is, the first functional group and the second functional group may be each subjected to a crosslinking reaction with the third functional group, wherein the first functional group and the second functional group may be the same and may also be different. In order to reduce manufacture cost and simplify process, the former is preferable.

Particularly, when the third functional group is an amino group, the first functional group and the second functional group may be epoxy groups, and at this time, the crosslinking agent may be a polyamine type initiator, the material of the spacer may be a resin material having a molecular structure of general formula:

the material of the second alignment film may be a polyimide or a polyamic acid, and the general formula of molecular structure of polyimide may be and thus the chemical equation of the crosslinking reaction of the spacer and the second alignment film with the crosslinking agent is:

It can be seen from the chemical formula described above that the amino group as the third functional group is crosslinked with the epoxy groups as the first functional group and the second functional group respectively, so as to allow the spacer and the second alignment film to be connected together by the crosslinking agent. In this way, a relatively high binding strength may be achieved. By comparing FIG. 3a to FIG. 3b, it can be known that the bonding agent 30 is provided between the spacer 4 and the second alignment film 502, and the structure of the liquid crystal display panel before crosslinking reaction is as shown in FIG. 3a; after the bonding agent 30 is subjected to the crosslinking reaction with the spacer 4 and the second alignment film 502, the molecular structure of the bonding agent 30 has changed, and the structure of the liquid crystal display panel at this time is as shown in FIG. 3b. In order to further improve the binding strength, the polyamine-type polymer initiator may have a molecular weight in a range of 1000-5000 Daltons and may have a viscosity in a range of 1.5-2.5 Pa•s.

Embodiment 3

Figure 4A:
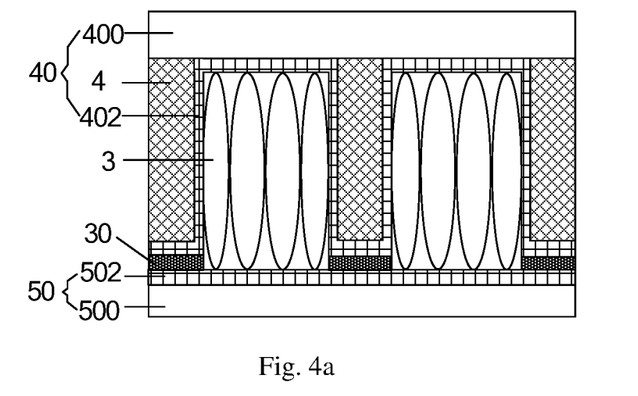
FIG. 4a is a structural schematic diagram of another liquid crystal display panel before crosslinking provided in an embodiment of this disclosure before crosslinking reaction.
Figure 4B:
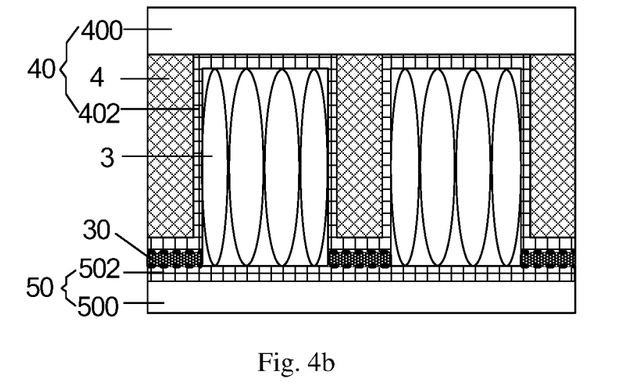
FIG. 4b is a structural schematic diagram of the liquid crystal display panel as shown in FIG. 4a after crosslinking reaction.

This embodiment provides a liquid crystal display panel as shown in FIGS. 4a and 4b. The liquid crystal display panel comprises a first substrate 40 and a second substrate 50 which are cell-assembled, wherein the first substrate 40 comprises a spacer 4 formed by a patterning process, the innermost side of the first substrate 40 is formed with a first alignment film 402 covering the spacer 4, and the innermost side of the second substrate 50 is formed with a second alignment film 502.

The inner surface of the first substrate and the inner surface of the second substrate being connected by a bonding agent at the position where the spacer is provided particularly comprises: the first alignment film and the second alignment film being connected by a bonding agent at the position where the spacer is provided.

Thus, in the process of cell-assembling the first substrate and the second substrate or in the process of using this liquid crystal display panel, since the first alignment film and the second alignment film are connected at the position where the spacer is provided, the spacer 4 will not slide back and forth as being squeezed by liquid crystal nearby, thereby prevent the problem of damage to the first alignment film and the second alignment film at the position corresponding to the spacer.

Further, the bonding agent may be a crosslinking agent.

In this embodiment, the first alignment film and the second alignment film may be connected by a crosslinking agent at the position where the spacer is provided. Particularly, the first alignment film and the second alignment film are connected together by crosslinking reaction occurring between a fourth functional group in the molecular structure of the material of the first alignment film and a sixth functional group in the molecular structure of the crosslinking agent and between a fifth functional group in the molecular structure of the material of the second alignment film and a sixth functional group in the molecular structure of the crosslinking agent.

Here, the sixth functional group in the molecular structure of the crosslinking agent has the same structure as that of the third functional group provided in embodiment 2. That is, the sixth functional group may be an amino group, and the crosslinking agent comprising an amino group may be a polyamine type initiator. The polyamine type initiator is generally a polymer compound having a molecular structure of general formula wherein R is a typical connecting group. Of course, the sixth functional group in the molecular structure of the crosslinking agent may also be other functional groups, as long as the crosslinking reaction may occur, and it is illustrated herein merely by exemplifying the sixth functional group as an amino group.

It is to be indicated herein that after the sixth functional group in the molecular structure of the crosslinking agent is determined, the fourth functional group in the molecular structure of the material of the first alignment film and the fifth functional group in the molecular structure of the material of the second alignment film are then determined. That is, the fourth functional group and the fifth functional group may be each subjected to a crosslinking reaction with the sixth functional group, wherein the fourth functional group and the fifth functional group may be the same and may also be different. In order to reduce manufacture cost and simplify process, the former is preferable.

Particularly, when the sixth functional group is an amino group, the fourth functional group and the fifth functional group may be epoxy groups, and at this time, the crosslinking agent may be a polyamine type initiator; in order to further reduce manufacture cost and simplify manufacture process, the material of the first alignment film and the material of the second alignment film are the same and may be each a polyimide or a polyamic acid, and the general formula of molecular structure of polyimide may be and thus the chemical equation of the crosslinking reaction of the first alignment film and the second alignment film with the crosslinking agent is:

It can be seen from the chemical formula described above that the amino group as the sixth functional group is subjected to crosslinking reaction with the epoxy groups as the fourth functional group and the fifth functional group respectively, so as to allow the first alignment film and the second alignment film to be connected together by the crosslinking agent. In this way, a relatively high binding strength may be achieved. By comparing FIG. 4a to FIG. 4b, it can be known that the bonding agent 30 is provided between the first alignment film 402 and the second alignment film 502, and the structure of the liquid crystal display panel before crosslinking reaction is as shown in FIG. 4a; after the bonding agent 30 is subjected to the crosslinking reaction with the first alignment film 402 and the second alignment film 502 respectively, the molecular structure of the bonding agent 30 has changed, and the structure of the liquid crystal display panel at this time is as shown in FIG. 4b. In order to further improve the binding strength, the polyamine-type polymer initiator may have a molecular weight in a range of 1000-5000 Daltons and may have a viscosity in a range of 1.5-2.5 Pa•s.

It is to be indicated herein that since the first alignment film is relatively thin, the crosslinking agent may penetrate the first alignment film so as to arrive at the spacer, and if the material of the spacer is same as the material of the spacer provided in embodiment 2, the first alignment film and the spacer are each subjected to a crosslinking reaction with the crosslinking agent at this time. Thus, the binding strength may be further increased.

Embodiment 4

Figure 5:
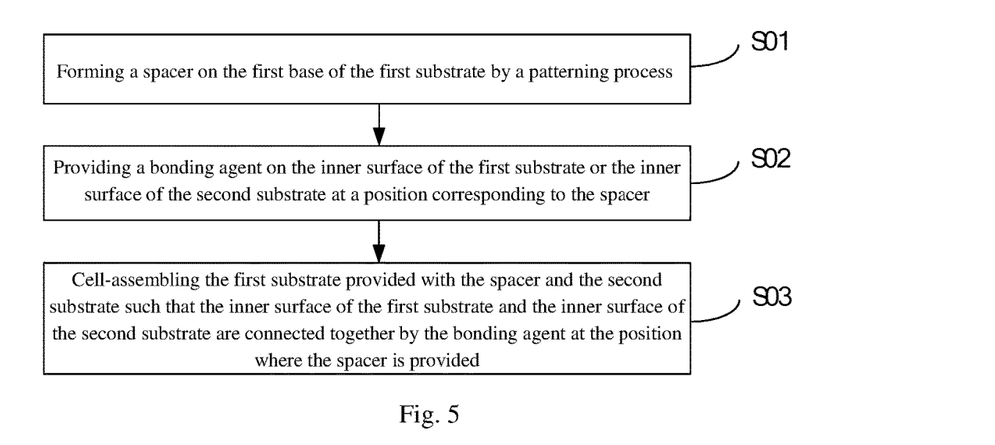
FIG. 5 is a schematic flow chart of a manufacturing method for a liquid crystal display panel provided in an embodiment of this disclosure.

This embodiment provides a manufacturing method for a liquid crystal display panel, the structure of the liquid crystal display panel formed by this method can be referred to that as shown in FIG. 2, and meanwhile with reference to those as shown in FIG. 5, this method comprises:

Step S01, forming a spacer 4 on the first base 400 of the first substrate 40 by a patterning process.

Particularly, the spacer may be formed by a one-time patterning process only using a normal mask plate for exposure, which may reduce production cost and simplify production process. The material of the first base may be glass or quartz, for example Corning glass, Asahi glass, quartz glass, etc.

Step S02, providing a bonding agent 30 on the inner surface 401 of the first substrate or the inner surface 501 of the second substrate at a position corresponding to the spacer 4.

Particularly, the bonding agent may be an adhesive, may also be a crosslinking agent, and may further be other substances having the function of connection. There is no specific limit on the bonding agent in this embodiment, as long as it is capable of having the function of connection.

Step S03, cell-assembling the first substrate 40 provided with the spacer and the second substrate 50 such that the inner surface 401 of the first substrate and the inner surface 501 of the second substrate are connected together by the bonding agent 30 at the position where the spacer 4 is provided.

This embodiment provides a manufacturing method for a liquid crystal display panel, and in this manufacturing method, by providing a bonding agent on the inner surface of the first substrate or the inner surface of the second substrate at a position corresponding to the spacer, the inner surface of the first substrate and the inner surface of the second substrate may be connected together by the bonding agent at the position where the spacer is provided, so as to prevent back-and-forth sliding of the spacer. This solves the problem of damage to the inner surfaces of the color filter substrate and the array substrate at the position corresponding to the spacer caused by the sliding of the spacer, and in turn improves the quality of the display panel.

Generally, the first substrate further comprises a first alignment film, the second substrate further comprises a second alignment film, such that liquid crystal molecules have a certain initial orientation. The order for forming the first alignment film of the first substrate and the spacer is not limited in this embodiment, and it is possible to first form a first alignment film on the first base of the first substrate and then form a spacer; or it is also possible to first form a spacer on the first base of the first substrate and then form a first alignment film which covers the spacer. Detailed illustrations will be made below by embodiment 5 and embodiment 6.

Embodiment 5

Figure 6:
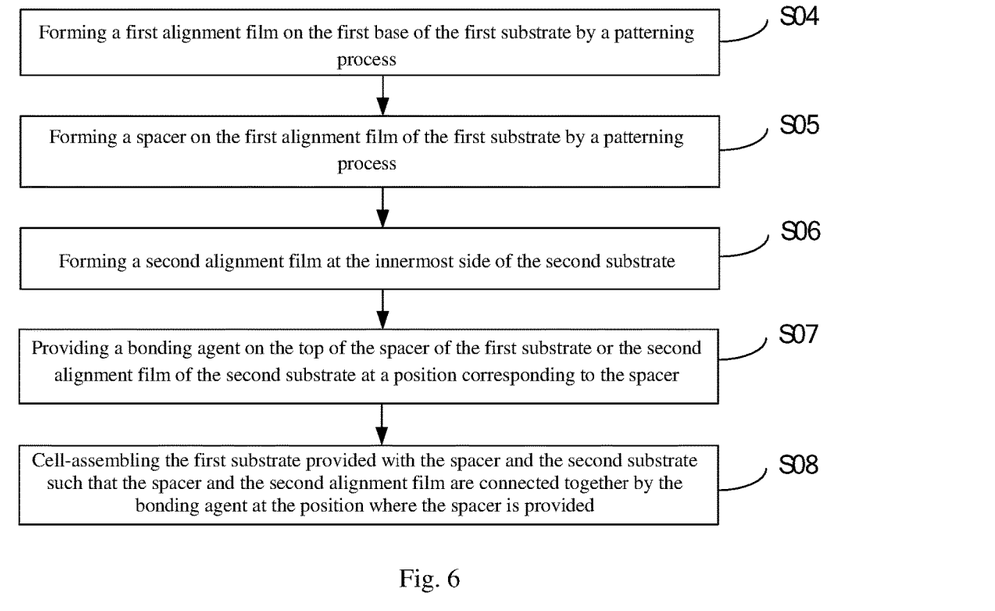
FIG. 6 is a schematic flow chart of another manufacturing method for a liquid crystal display panel provided in an embodiment of this disclosure.

This embodiment provides a manufacturing method for a liquid crystal display panel, the structure of the liquid crystal display panel formed by this method can be referred to that as shown in FIGS. 3a and 3b, and meanwhile with reference to those as shown in FIG. 6, this method comprises:

Step S04, forming a first alignment film 402 on the first base 400 of the first substrate 40 by a patterning process.

Particularly, a first alignment film may be formed on the first base of the first substrate by a one-time patterning process, wherein the material of the first alignment film may be a polyimide or a polyamic acid, and the material of the first base may be glass or quartz, for example Corning glass, Asahi glass, quartz glass, etc.

Step S05, forming a spacer on the first alignment film 402 of the first substrate 40 by a patterning process.

Particularly, the spacer may be formed by a one-time patterning process only using a normal mask plate for exposure, which may reduce production cost and simplify production process.

Step S06, forming a second alignment film 502 at the innermost side of the second substrate 50.

Particularly, a second alignment film 502 may be formed on the second base 500 of the second substrate 50 by a one-time patterning process, and the second alignment film 502 is located at the innermost side of the second substrate 50. The material of the second base 500 may be glass or quartz, for example Corning glass, Asahi glass, quartz glass, etc.

Step S07, providing a bonding agent 30 on the top of the spacer 4 of the first substrate 40 or the second alignment film 502 of the second substrate 50 at a position corresponding to the spacer 4.

Particularly, the bonding agent may be an adhesive, may also be a crosslinking agent, and may further be other substances having the function of connection. There is no specific limit on the bonding agent in this embodiment, as long as it is capable of having the function of connection.

Step S08, cell-assembling the first substrate 40 provided with the spacer 4 and the second substrate 50 such that the spacer 4 and the second alignment film 502 are connected together by the bonding agent 30 at the position where the spacer 4 is provided.

Thus, in the process of using the liquid crystal display panel formed by the manufacturing method described above, since the spacer and the second alignment film are connected at the position where the spacer is provided, the spacer 4 will not slide back and forth as being squeezed by liquid crystal nearby, thereby prevent the problem of damage to the spacer and the second alignment film in contact with the spacer.

Further, the bonding agent is a crosslinking agent; and thus the step of connecting the spacer and the second alignment film together by the bonding agent at the position where the spacer is provided comprises:

allowing crosslinking reaction between a first functional group in the molecular structure of the material of the spacer and a third functional group in the molecular structure of the crosslinking agent and between a second functional group in the molecular structure of the material of the second alignment film and a third functional group in the molecular structure of the crosslinking agent to occur, by a curing process, such that the spacer and the second alignment film are connected together by the crosslinking agent at the position where the spacer is provided.

It is to be indicated herein that the curing process herein refers to a process in which a substance is converted from a low molecular substance to a polymer. According to the type of the crosslinking agent, processes such as thermal curing, photocuring, or the like may be used such that crosslinking reaction occurs between a first functional group in the molecular structure of the material of the spacer and a third functional group in the molecular structure of the crosslinking agent and between a second functional group in the molecular structure of the material of the second alignment film and a third functional group in the molecular structure of the crosslinking agent. In order to simplify process, the crosslinking curing process described above and the sealant curing process by which the first substrate and the second substrate form the liquid crystal display panel may be carried out simultaneously. Furthermore, the materials, molecular structures, and crosslinking reaction principle of the spacer, the crosslinking agent and the second alignment film described above can be referred to embodiment 2, and verbose words are omitted herein.

Figure 7:
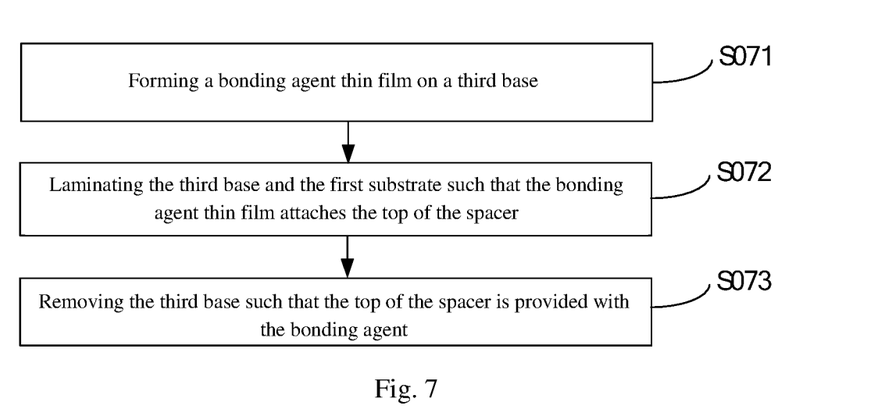
FIG. 7 is a schematic flow chart of providing a bonding agent on the top of a spacer of a first substrate in step S07 in FIG. 6.

Optionally, with reference to those as shown in FIG. 7, the step of providing a bonding agent on the top of the spacer of the first substrate comprises:

Step S071, forming a bonding agent thin film on a third base.

Particularly, the material of the bonding agent may be printed onto a third base using a resin roll, and of course the bonding agent thin film may be formed in other ways, wherein the third base may be a transparent glass base, etc., and the bonding agent may be a crosslinking agent, for example a polyamine type initiator.

Step S072, laminating the third base and the first substrate such that the bonding agent thin film attaches the top of the spacer. Because the bonding agent thin film has a certain viscosity, the bonding agent thin film and the top of the spacer may be adhered together.

Step S073, removing the third base such that the top of the spacer is provided with the bonding agent.

By the steps described above, the bonding agent provided on the inner surface of the first substrate at the position corresponding to the spacer has a uniform thickness, and thus a liquid crystal display panel having a uniform thickness may be formed after cell-assembling the first substrate and the second substrate, which is favorable to improve the quality of the liquid crystal display panel.

Embodiment 6

Figure 8:
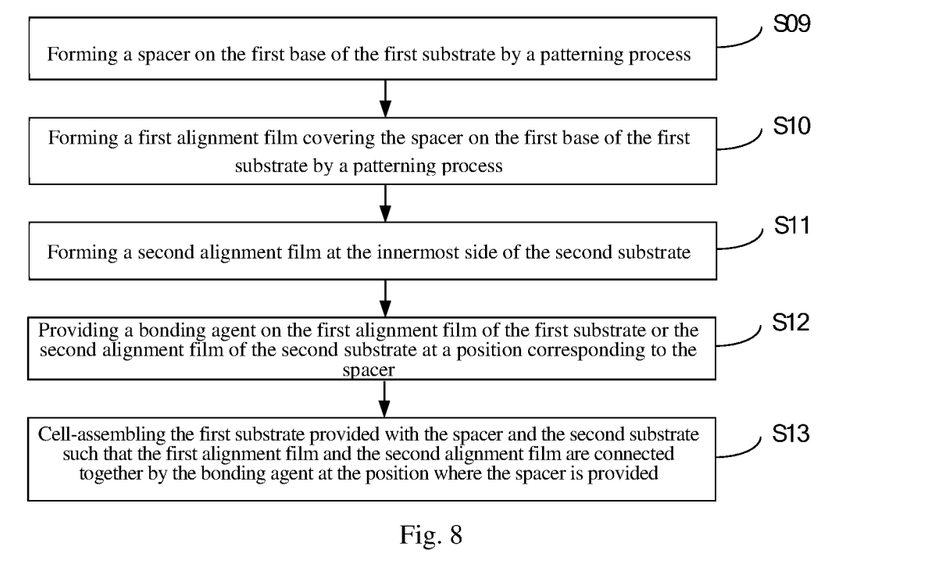
FIG. 8 is a schematic flow chart of another manufacturing method for a liquid crystal display panel provided in an embodiment of this disclosure.

This embodiment provides a manufacturing method for a liquid crystal display panel, the structure of the liquid crystal display panel formed by this method can be referred to that as shown in FIGS. 4a and 4b, and meanwhile with reference to those as shown in FIG. 8, this method comprises:

Step S09, forming a spacer 4 on the first base 400 of the first substrate 40 by a patterning process.

Step S10, forming a first alignment film 402 covering the spacer 4 on the first base 400 of the first substrate 40 by a patterning process.

Particularly, a first alignment film may be formed on the first base of the first substrate by a one-time patterning process, wherein the material of the first alignment film may be a polyimide or a polyamic acid, and the material of the first base may be glass or quartz, for example Corning glass, Asahi glass, quartz glass, etc.

Step S11, forming a second alignment film 502 at the innermost side of the second substrate 50.

Particularly, a second alignment film 502 may be formed on the second base 500 of the second substrate 50 by a one-time patterning process, and the second alignment film 502 is located at the innermost side of the second substrate 50. The material of the second base 500 may be glass or quartz, for example Corning glass, Asahi glass, quartz glass, etc.

Step S12, providing a bonding agent 30 on the first alignment film 402 of the first substrate 40 or the second alignment film 502 of the second substrate 50 at a position corresponding to the spacer 4.

Particularly, the bonding agent may be an adhesive, may also be a crosslinking agent, and may further be other substances having the function of connection. There is no specific limit on the bonding agent in this embodiment, as long as it is capable of having the function of connection.

Step S13, cell-assembling the first substrate 40 provided with the spacer 4 and the second substrate 50 such that the first alignment film 402 and the second alignment film 502 are connected together by the bonding agent 30 at the position where the spacer 4 is provided.

Thus, in the process of using the liquid crystal display panel formed by the manufacturing method described above, since the first alignment film and the second alignment film are connected at the position where the spacer is provided, the spacer 4 will not slide back and forth as being squeezed by liquid crystal nearby, thereby prevent the problem of damage to the first alignment film and the second alignment film at the position corresponding to the spacer.

Further, the bonding agent is a crosslinking agent; and thus the step of connecting the first alignment film and the second alignment film together by the bonding agent at the position where the spacer is provided comprises:

allowing crosslinking reaction between a fourth functional group in the molecular structure of the material of the first alignment film and a sixth functional group in the molecular structure of the crosslinking agent and between a fifth functional group in the molecular structure of the material of the second alignment film and a sixth functional group in the molecular structure of the crosslinking agent to occur, by a curing process, such that the first alignment film and the second alignment film are connected together by the crosslinking agent at the position where the spacer is provided.

It is to be indicated herein that the curing process herein refers to a process in which a substance is converted from a low molecular substance to a polymer. According to the type of the crosslinking agent, processes such as thermal curing, photocuring, or the like may be used such that crosslinking reaction occurs between a fourth functional group in the molecular structure of the material of the first alignment film and a sixth functional group in the molecular structure of the crosslinking agent and between a fifth functional group in the molecular structure of the material of the second alignment film and a sixth functional group in the molecular structure of the crosslinking agent. In order to simplify process, the crosslinking curing process described above and the sealant curing process by which the first substrate and the second substrate form the liquid crystal display panel may be carried out simultaneously. Furthermore, the materials, molecular structures, and crosslinking reaction principle of the first alignment film, the crosslinking agent and the second alignment film described above can be referred to embodiment 3, and verbose words are omitted herein.

Figure 9:
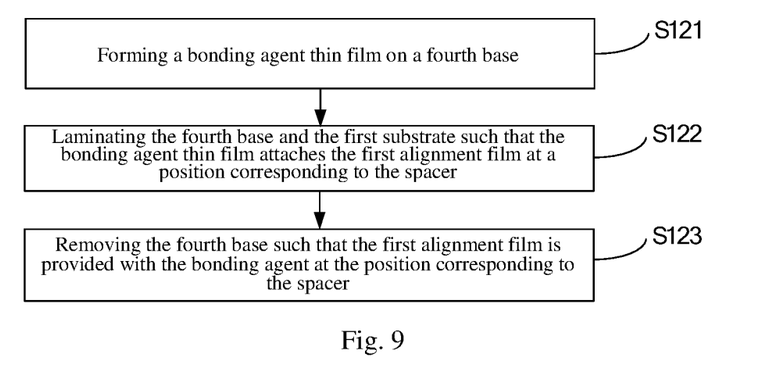
FIG. 9 is a schematic flow chart of providing a bonding agent on a first alignment film of a first substrate at a position corresponding to a spacer in step S12 in FIG. 8.

Optionally, with reference to those as shown in FIG. 9, the step of providing a bonding agent on the first alignment film of the first substrate at the position corresponding to the spacer comprises:

Step S121, forming a bonding agent thin film on a fourth base.

Particularly, the material of the bonding agent may be printed onto a fourth base using a resin roll, and of course the bonding agent thin film may be formed in other ways, wherein the fourth base may be a transparent glass base, etc., and the bonding agent may be a crosslinking agent, for example a polyamine type initiator.

Step S122, laminating the fourth base and the first substrate such that the bonding agent thin film attaches the first alignment film at a position corresponding to the spacer. Because the bonding agent thin film has a certain viscosity, the bonding agent thin film and the first alignment film may be adhered together at the position corresponding to spacer.

Step S123, removing the fourth base such that the first alignment film is provided with the bonding agent at the position corresponding to the spacer.

By the steps described above, the bonding agent provided on the inner surface of the first substrate at the position corresponding to the spacer has a uniform thickness, and thus a liquid crystal display panel having a uniform thickness may be formed after cell-assembling the first substrate and the second substrate, which is favorable to improve the quality of the liquid crystal display panel.

Those described above are only some specific embodiments of this disclosure, and the scope of this disclosure is not limited thereto. Within the technical scope disclosed by this disclosure, any person skilled in the art will easily conceive variations or replacements, which should be covered by the scope of this disclosure. Therefore, the scope of this disclosure should be determined by the terms of the claims.

What is claimed is:
1. A liquid crystal display panel, comprising:
a first substrate and a second substrate which are cell-assembled,
wherein said first substrate comprises a spacer formed by a patterning process and a first alignment film, said spacer being located at the innermost side of said first substrate;
the innermost side of said second substrate is formed with a second alignment film, and said spacer and said second alignment film are connected by a crosslinking agent at a position where said spacer is provided, wherein said spacer and said second alignment film being connected by a crosslinking agent at a position where said spacer is provided comprise: said spacer and said second alignment film being connected together by crosslinking reactions occurring between a first functional group in the molecular structure of the material of said spacer and a third functional group in the molecular structure of said crosslinking agent and between a second functional group in the molecular structure of the material of said second alignment film and a third functional group in the molecular structure of said crosslinking agent, wherein the material of said crosslinking agent is a polyamine type initiator having a molecular weight in a range of 1000-5000 Daltons, and wherein said third functional group is an amino group, and said first functional group and said second functional group are the same.

2. A liquid crystal display panel, comprising:

a first substrate and a second substrate which are cell-assembled, wherein said first substrate comprises a spacer formed by a patterning process, and the innermost side of said first substrate is formed with a first alignment film covering said spacer;

the innermost side of said second substrate is formed with a second alignment film, and said first alignment film and said second alignment film are connected by a crosslinking agent at a position where said spacer is provided, wherein said first alignment film and said second alignment film being connected by a crosslinking agent at a position where said spacer is provided comprise: said first alignment film and said second alignment film being connected together by crosslinking reactions occurring between a fourth functional group in the molecular structure of the material of said first alignment film and a sixth functional group in the molecular structure of said crosslinking agent and between a fifth functional group in the molecular structure of the material of said second alignment film and a sixth functional group in the molecular structure of said crosslinking agent, wherein the material of said crosslinking agent is a polyamine type initiator having a molecular weight in a range of 1000-5000 Daltons, and wherein said sixth functional group is an amino group, and said fourth functional group and said fifth functional group are the same.

* * * * *